Nov. 6, 1951          H. HERZOG          2,573,790
VALVE REPAIR TOOL
Filed Jan. 3, 1949
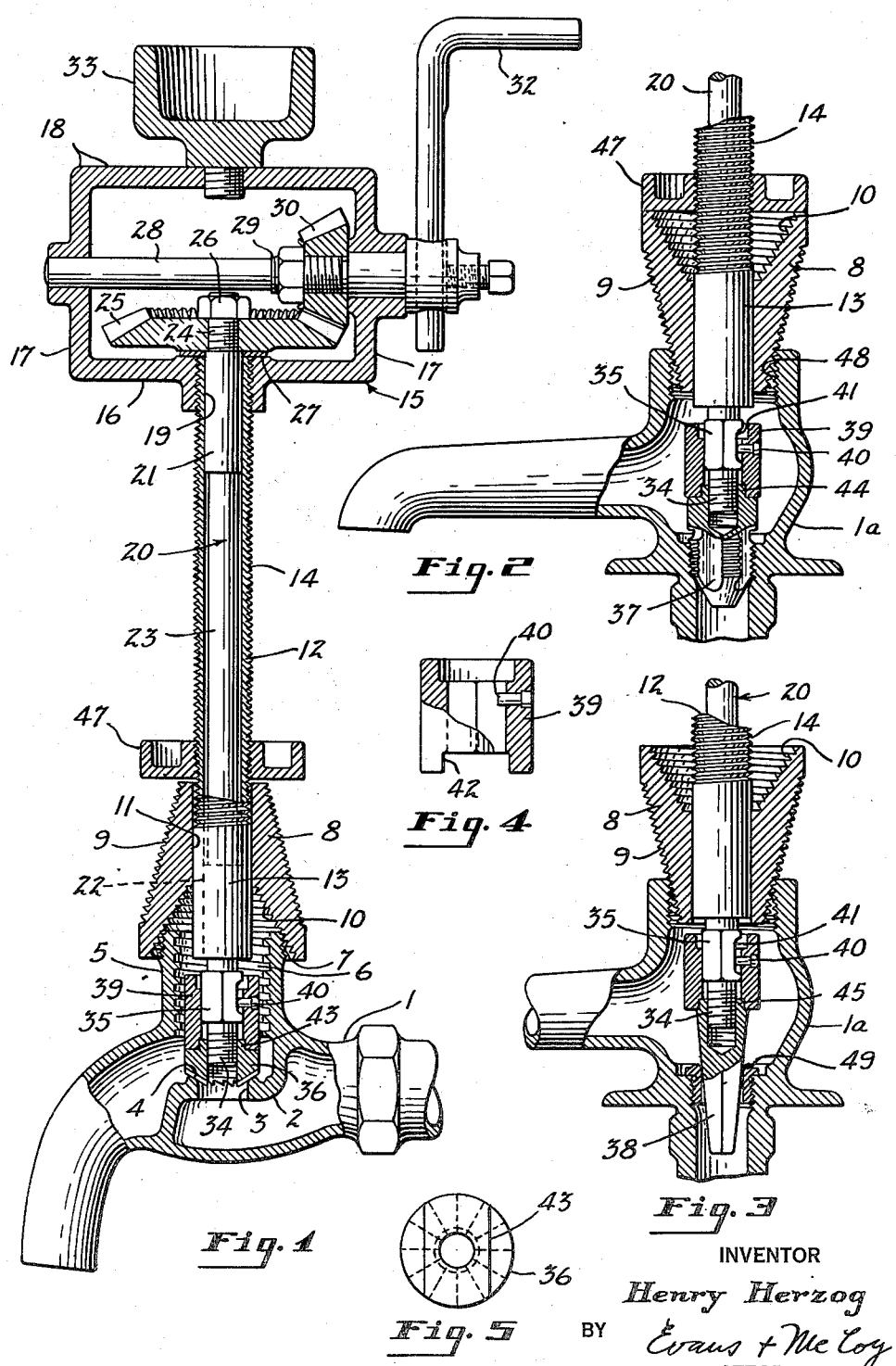
INVENTOR
Henry Herzog
BY Evans + McCoy
ATTORNEYS Patented Nov. 6, 1951

2,573,790

UNITED STATES PATENT OFFICE 2,573,790

VALVE REPAIR TOOL

Henry Herzog, Cleveland, Ohio

Application January 3, 1949, Serial No. 68,780

8 Claims. (Cl. 90—12.5)

This invention relates to tools for repairing faucet seats and other valve seats in casings which have openings opposite the seat through which access may be had thereto.

In household water faucets the valve seats frequently become scored or grooved to such an extent that there is continuous leakage past the face of the washer engaging the seat. To correct this condition it is common practice to resurface such valve seats to eliminate the surface irregularities, and when such valve seats become badly worn it is common practice to tap the valve opening to receive an externally threaded replaceable valve seat that is screwed into place in the valve opening.

The tool of the present invention is designed for use in the valve resurfacing operation, to tap the valve opening to insert or remove the replaceable seats, means being provided to limit the axial movements of the tool spindle to provide the desired depth of cut for the operation being performed.

Another object of the invention is to provide a hand operated tool that can be quickly and easily attached to or detached from the valve casing and adjusted for the particular operation to be performed.

With the above and other objects in view, the invention may be said to comprise the tool as illustrated in the accompanying drawings and hereinafter described, together with such variations and modifications thereof as will be apparent to one skilled in the art to which the invention pertains.

Reference should be had to the accompanying drawings forming a part of this specification, in which:

Figure 1 is a vertical sectional view showing the tool of the present invention mounted on a water faucet and having a seat resurfacing element on the tool spindle.

Fig. 2 is a fragmentary vertical section showing the tool of the present invention mounted on a faucet and having a tap attached to the tool spindle for threading the valve opening to receive a replaceable seat;

Fig. 3 is a fragmentary sectional view showing the tool employed as a wrench to apply or remove a replaceable valve seat;

Fig. 4 is a side elevation of the tool driving clutch sleeve, a portion thereof being broken away and shown in section; and Fig. 5 is a top plan view of the milling cutter.

In Fig. 1 of the drawings the tool of the present invention is shown applied to a water faucet 1 having an internal closure wall 2 provided with a valve opening 3, and with an annular valve seat 4 surrounding the opening. The faucet 1 has a tubular extension 5 that provides an opening axially alined with the valve seat, the extension 5 having coarse internal threads 6 for engagement with valve stem threads and a fine external thread 7 upon which a valve retaining cap may be screwed.

The tool of the present invention is mounted upon the faucet 1 by means of an adaptor 8 which has an external conical threaded surface 9 and an internal conical threaded surface 10. The adaptor may be positioned on a faucet such as shown in Fig. 1 by engagement of the internal threads 10 with the external thread 7 and where the valve casing is provided with fine internal screw threads the adaptor may be reversely positioned with its external threads in engagement with internal threads of the faucet as shown in Figs. 2 and 3. The adaptor 8 has an axial bore 11 which is in axial alinement with the valve seat of the faucet when the adaptor 8 is secured in place on the valve receiving portion of the faucet.

A tube 12 has a cylindrical lower end portion 13 that has a sliding fit in the axial bore 11, and above the cylindrical end portion 13 the tube 12 has an externally threaded portion 14. Secured to the upper end of the tube 12 there is a frame 15 which may be in the form of a rectangular casting having a bottom 16, vertical sides 17 and a horizontal top portion 18. The bottom 16 of the frame has a central threaded opening 19 which receives the upper end of the tube 12 in which a tool spindle 20 is journaled. The spindle 20 has upper and lower bearing portions 21 and 22 that have a rotating fit in upper and lower end portions of the tube 12 and a reduced intermediate portion 23.

The spindle 20 has a reduced threaded upper end 24 that receives a bevel gear 25 which has a central threaded opening to receive the threaded portion 24 of the spindle, the gear 25 being secured in adjusted position on the spindle by means of a lock nut 26. A bearing washer 27 is preferably interposed between the under side of the gear 25 and the bottom member 16 of the frame.

A transverse shaft 28 is journaled in the vertical walls 17 of the frame and extends transversely across the upper end of the spindle 20. The shaft has a threaded portion 29 that receives a bevel gear 30 that meshes with the bevel gear 25 on the spindle, and attached to the shaft 28 at one side of the frame 15 there is a hand crank 32 by means of which the spindle 20 may be driven through the gears 25 and 30. The gear 25 is held against axial movement between the washer 27 and the gear 30 and, being fixed to the spindle 20, holds the spindle 20 against endwise movements in the tube 12. A handle 33 attached to the top member 18 of the frame is in axial alinement with the spindle 20. During operation of the tool the operator grasps the handle 33 to steady the tool while the spindle is driven by means of the crank 32.

The lower end of the spindle 20 projects below the lower end of the tube 12 and has a reduced threaded end 34 and an enlarged square portion 35 above the upper end of the threaded portion 34. The threaded portion 34 of the spindle is adapted to receive various tools such as the milling cutter 36 shown in Fig. 1 for resurfacing a valve seat, the tap 37 shown in Fig. 2 for threading a valve opening, or a wrench 38 such as shown in Fig. 3 for inserting or removing a valve insert.

The square portion 35 of the spindle receives a clutch sleeve 39 that slidably fits upon the square portion 35 of the spindle and that is provided with a pin 40 extending into a vertically elongated recess 41 in the square portion 35 to retain the sleeve on the spindle and permit limited vertical movement thereof. The sleeve 39 is provided with a suitable clutch face at its lower end such as provided by diametrically opposite recesses 42, and the tools 36, 37 and 38 which screw upon the threaded portions 34 of the spindle have clutch faces at their upper ends for engagement with the clutch face of the sleeve such as the projection 43 of the cutting tool 36, the projection 44 of the tap 37 and the projection 45 of the wrench 36. Each of the projections 43, 44 and 45 fits in the recesses 42 of the clutch sleeve 39 which provides a positive driving connection between the spindle and tool without tightening the threaded connection between them. The clutch sleeve facilitates the removal and replacement of tools on the spindle since it makes it unnecessary to screw the tool tightly on the threaded end 34, and the tool can be quickly and easily unscrewed from the spindle.

Above the adaptor 8 a stop nut 47 is provided on the threaded portion 14 of the tube 12. In operation of the device the nut 47 is positioned high enough on the tube 12 to permit the cutting tool carried by the spindle to be lowered into engagement with the valve seat. The nut 47 is then adjusted to provide a space between its lower face and the upper end of the adaptor 8 corresponding to the depth of the cut which it is desired to make on the valve seat. The operator then grasps the handle 33 with one hand and turns the crank 32 with the other and operates the spindle until downward feed of the spindle and tube is arrested by engagement of the stop nut 47 with the adaptor 8. While the nut 47 stops the feed of the cutter, rotation of the cutter can continue and this is advantageous since the rotation of the cutter after its feed is arrested serves to impart a smooth surface to the seat.

In Fig. 2 of the drawings a modified faucet 1a is shown having a valve receiving extension provided with an internal screw thread 48 which receives the external thread 9 of the adaptor 8, the adaptor in this instance being in a position reverse to that shown in Fig. 1.

In Fig. 2 the tap 37 is shown attached to the lower end of the spindle 20. In tapping the valve opening the stop nut 47 is adjusted to a height above the upper end of the adaptor 8 corresponding to the desired downward feed of the tool for the tapping operation, and the tool is then operated as above described to cut the threads in the valve opening. After the threading operation the tool of the present invention may be employed to screw a replaceable valve seat into place in a threaded valve opening.

As shown in Fig. 3, the wrench 38 tapers downwardly and is of square cross section so that it is adapted to interiorly engage a replaceable seat 49 which is externally threaded to screw into the tapped opening.

By providing a spindle support which is freely slidable in the adaptor and an adaptor engaging stop which is axially adjustable on the spindle support, the extent of axial feed of the tool spindle may be regulated to suit the particular machining operation that is being performed on the valve seat, and various operations such as reaming and tapping may be quickly and easily performed.

It is to be understood that in accordance with the provisions of the patent statutes variations and modifications of the specific devices herein shown and described may be made without departing from the spirit of the invention.

What I claim is:

1. A tool for use in repairing valve seats in casings provided with an opening alined with the seat comprising an adaptor having a bore and portions engageable with the valve casing to aline said bore with the valve seat, a tube mounted to slide axially in said bore, said tube having an end portion that has a sliding fit in said bore, a frame attached to the opposite end of said tube, a spindle journaled in said tube and held against axial movements therein, said spindle having a tool receiving portion projecting beyond the end of the tube opposite that attached to said frame, gearing in said frame for driving said spindle, and a stop mounted on said tube for adjustment axially thereof and engageable with said adaptor to limit movement of the tube and of the tool receiving end of the spindle toward the valve seat.

2. A tool for use in repairing valve seats in casings provided with an opening alined with the seat comprising an adaptor having a bore and portions engageable with the valve casing to aline said bore with the valve seat, a tube mounted to slide axially in said bore, said tube having an end portion that has a sliding fit in said bore, a frame attached to the opposite end of said tube, a spindle journaled in said tube and held against axial movements therein, said spindle having a tool receiving portion projecting beyond the end of the tube opposite that attached to said frame, a handle attached to said frame, a bevel gear attached to said spindle within the frame, a shaft journaled in said frame and transversely disposed with respect to said spindle, a bevel gear on said shaft meshing with the bevel gear on said spindle, a hand crank attached to said shaft, and a stop mounted on said tube for adjustment axially thereof and engageable with said adaptor to limit movement of the tube and of the tool receiving end of the spindle toward the valve seat.

3. A tool for use in repairing valve seats in casings provided with an opening alined with the seat comprising an adaptor having a bore and portions engageable with the valve casing to aline said bore with the valve seat, a tube mounted to slide axially in said bore, said tube having a cylindrical end portion that has a sliding fit in said bore and an externally threaded portion inwardly of said cylindrical end portion, a frame attached to the opposite end of said tube, a spindle journaled in said tube and held against axial movements therein, said spindle having a tool receiving portion projecting beyond said cylindrical end portion of the tube, gearing in said frame for driving said spindle, and a stop nut mounted upon the threaded portion of said tube and engageable with said adaptor to limit movement of the tube and of the tool receiving end of said spindle toward the valve seat.

4. A tool of the character described comprising an adaptor, a tube mounted for axial movement in said adaptor, a spindle journaled in said tube and having a tool receiving portion provided with a threaded lower end portion of reduced diameter below the lower end of said tube, a clutch sleeve slidably and nonrotatably mounted on the spindle above said threaded portion and having a clutch face at its lower end, and a tool screwed on said threaded end and having a clutch face with which the clutch face of said sleeve engages, whereby said tool may be held against turning movements on the threaded portion of the spindle.

5. A tool for use in repairing valve seats in casings provided with an opening alined with the seat comprising an adaptor having an axial bore and screw threaded conical external and internal surfaces for engagement with internal or external screw threads on the valve casing, a tube mounted to slide axially in said bore, said tube having a cylindrical end portion that has a slidable fit in said bore, a frame attached to the opposite end of said tube, a spindle journaled in said tube and held against axial movements therein, said spindle having a tool receiving portion projecting beyond said cylindrical end of said tube, spindle driving means including a hand crank carried by said frame, and a stop collar mounted for axial adjustment on said tube and engageable with said adaptor to limit movement of the tube and of the tool receiving end of said spindle toward the valve seat.

6. A tool for use in repairing valve seats in casings provided with an opening alined with the seat comprising an adaptor having an axial bore and screw threaded conical external and internal surfaces for engagement with internal or external screw threads on the valve casing, a tube mounted to slide axially in said bore, said tube having a cylindrical end portion that has a slidable fit in said bore, a frame attached to the opposite end of said tube, a spindle journaled in said tube and held against axial movements therein, said spindle having a tool receiving portion projecting beyond said cylindrical end of said tube, a stop collar on said tube and engageable with said adaptor to limit movement of the tube and of the tool receiving end of said spindle toward the valve seat, a handle attached to said frame in axial alinement with said tube and spindle, a bevel gear attached to said spindle, a second bevel gear mounted in said frame and meshing with the first, and a hand crank connected to said second gear to drive the same.

7. In a tool of the character described a supporting member, a spindle journaled in said supporting member and having a threaded tool receiving portion at its lower end below said supporting member, a tool screwed upon said threaded portion and having a clutch portion at its upper end, and a clutch sleeve having a clutch portion at its lower end for driving engagement with the clutch portion of said tool, said sleeve being slidably and nonrotatably mounted on said spindle above the threaded portion and movable by gravity into engagement with the clutch portion of said tool.

8. In a tool of the character described a supporting member, a spindle journaled in said supporting member and having a threaded tool receiving portion at its lower end below said supporting member, a tool screwed upon said threaded portion and having a clutch portion at its upper end, a clutch sleeve having a clutch portion at its lower end for driving engagement with the clutch portion of said tool, said sleeve being slidably and nonrotatably mounted on said spindle above the threaded portion and movable by gravity into engagement with the clutch portion of said tool, and retaining means limiting the downward movement of said sleeve on said spindle.

HENRY HERZOG.

REFERENCES CITED

The following references are of record in the file of this patent:

UNITED STATES PATENTS

| Number | Name | Date |
| --- | --- | --- |
| 802,968 | Burki | Oct. 31, 1905 |
| 1,085,832 | Westerheide | Feb. 3, 1914 |
| 1,525,202 | Rogers | Feb. 3, 1925 |
| 1,693,767 | Smith | Dec. 4, 1928 |
| 1,888,259 | Burston | Nov. 22, 1932 |
| 2,106,173 | Hawker | Jan. 25, 1938 |

FOREIGN PATENTS

| Number | Country | Date |
| --- | --- | --- |
| 9,871 | Great Britain | of 1908 |
| 324,699 | Germany | Sept. 1, 1920 |